(12) United States Patent
Hansen

(10) Patent No.: US 7,396,225 B2
(45) Date of Patent: Jul. 8, 2008

(54) DEVICE FOR BLOW MOULDING, FILLING AND CLOSING PLASTIC CONTAINERS

(76) Inventor: Bernd Hansen, Talstr. 22-30, 74429 Sulzbach-Laufen (DE)

( * ) Notice: Subject to any disclaimer, the term of this patent is extended or adjusted under 35 U.S.C. 154(b) by 370 days.

(21) Appl. No.: 10/517,204

(22) PCT Filed: Apr. 27, 2004

(86) PCT No.: PCT/EP2004/004419

§ 371 (c)(1),
(2), (4) Date: Dec. 8, 2004

(87) PCT Pub. No.: WO2004/103817

PCT Pub. Date: Dec. 2, 2004

(65) Prior Publication Data

US 2005/0220927 A1    Oct. 6, 2005

(30) Foreign Application Priority Data

May 23, 2003    (DE) ............................... 103 23 335

(51) Int. Cl.
*B29C 49/36* (2006.01)
*B29C 49/56* (2006.01)

(52) U.S. Cl. ..................... 425/524; 425/540; 425/541
(58) Field of Classification Search ................. 425/524, 425/540, 541; B29C 49/36, 49/56
See application file for complete search history.

(56) References Cited

U.S. PATENT DOCUMENTS

| | | | |
|---|---|---|---|
| 3,833,286 A * | 9/1974 | Deserno et al. ............. 359/278 |
| 3,877,861 A * | 4/1975 | Kiefer et al. ................ 425/541 |
| 3,883,286 A   | 5/1975 | Kinslow, Jr. et al. |
| 3,969,455 A * | 7/1976 | Moller ....................... 264/512 |
| 4,801,260 A * | 1/1989 | Oles et al. ................... 425/527 |
| 4,880,581 A * | 11/1989 | Dastoli et al. ................ 264/39 |
| 5,478,229 A * | 12/1995 | Kato et al. .................. 425/529 |
| 5,759,218 A * | 6/1998 | Martin et al. .............. 55/385.1 |
| 5,962,039 A * | 10/1999 | Katou et al. ................ 425/210 |
| 6,102,685 A * | 8/2000 | Miura et al. ................ 425/193 |

(Continued)

FOREIGN PATENT DOCUMENTS

DE    199 26 329 A1    12/2000

(Continued)

*Primary Examiner*—Robert B. Davis
(74) *Attorney, Agent, or Firm*—Roylance, Abrams, Berdo & Goodman, L.L.P.

(57) ABSTRACT

A production device for performing a blow molding, charging, and sealing process for plastic containers has a first type of molding device (10) into which a tube of plasticized plastic material may be introduced. The molding device (10) of the first type may be rotated to individual spatially separate stations (22, 24, 26) about an axis (20). One station (24) performs the function of blow molding of the container. Another station (26) charges and seals the blow molded container. Simultaneously a tube of plasticized plastic material can be blow molded for production of the plastic container and a corresponding container produced in this manner at the other station can be charged with the medium, in particular one in the form of a fluid, and to seal it. The cycle times may be reduced in comparison to cycle times of production devices of the state of the art so that the rates of output of charged containers sealed under sterile conditions to be produced may be significantly increased.

14 Claims, 4 Drawing Sheets

U.S. PATENT DOCUMENTS

| | | |
|---|---|---|
| 6,214,282 B1 | 4/2001 | Katou et al. |
| 2006/0165831 A1* | 7/2006 | Hansen ....................... 425/150 |
| 2006/0172027 A1* | 8/2006 | Hansen ....................... 425/150 |

FOREIGN PATENT DOCUMENTS

| | | | |
|---|---|---|---|
| EP | 464933 A2 * | 1/1992 | |
| EP | 0 921 932 B1 | 5/2002 | |
| EP | 0 858 878 B1 | 9/2002 | |
| JP | 63-297024 | 12/1988 | |

* cited by examiner

DEVICE FOR BLOW MOULDING, FILLING AND CLOSING PLASTIC CONTAINERS

FIELD OF THE PRESENT INVENTION

The present invention relates to a production device for performing a blow molding, charging, and sealing process for plastic containers, including at least a molding device of a first type into which at least one tube of plasticized plastic material may be introduced.

BACKGROUND OF THE INVENTION

Generic processes and devices for production of plastic containers are known in the state of the art (e.g., DE 199 26 329 A1). A tube of plasticized plastic material is extruded into a molding device with one end of the tube is sealed by bonding. This tube is expanded by generation of a pneumatic pressure gradient which acts on the tube and is applied for the purpose of formation of the container to the molding wall of the molding device having two opposite molding tools. The plastic container is charged under sterile conditions inside the molding device, by a suitable charging mandrel. After the charging mandrel has been removed, the plastic container is then hermetically sealed and a predetermined head geometry is formed by two container shaping jaws movable toward each other by hydraulic drive means to a closed position and away from each other over the same path in the opposite direction to an open position for formation of the plastic container itself for subsequent storage of the fluid.

The head geometries generated by the two controlled head jaws also regularly comprise the neck component of the plastic container, including ampules. The containers may be opened by a point of separation closed by a head piece for a fluid removal process as soon as the head piece is separated by a toggle component at the point of separation. Thus, the headpiece is removed from the plastic container itself.

Processes such as these have been disclosed in a number of embodiments, and are widely employed in packaging systems for liquid or paste products.

The hydraulic drive systems regularly used in practical applications for the respective movement of the shaping tools create problems in that any leakage may result in fouling by the stored fluid. Such fouling leads to problems, particularly when the shaping machines are used for plastic containers in pharmaceutical applications, in the area of foods and in medical technology in general. The maintenance effort is also increased. The hydraulic drive systems often do not reach the cycle times desired or low cycle times work to the detriment of precise positioning of the shaping tools for container shaping. In the case of the known production devices, the blow molding, charging and sealing process are carried out stationarily in temporal sequence in one production machine, so that correspondingly long production times are required for the entire production process.

Conventional rotation plastic blow molding machines (see e.g., EP-B-0 921 932, and EP-B-0 858 878) customarily have a wheel mounted on a base frame for rotation about a horizontal axis of rotation. They are employed to overcome the disadvantage indicated, and in particular, to achieve faster cycle times in production of plastic containers. The wheel contains a frame which supports several molding stations, each station having a pair of mold frames for mounting of a pair on molding halves. The mold frames may be moved between a mold opening point at which the mold halves are positioned a certain distance from each other to receive an extruded plastic parison and a mold closing position in which the mold halves form a closed cavity in which the parison is blow molded. However, the blow-molded containers can neither be charged nor sealed in a sterile manner by these rotation plastic blow molding machines of the state of the art. Accordingly, they are suitable only for production of empty containers which are provided at another site with a beverage content or the like outside the rotation molding machine, and are also provided with a suitable seal such as a screw-type cap.

SUMMARY OF THE INVENTION

An object of the present invention is to create a production device for performing of a blow molding, charging and sealing process for plastic containers permitting application of modern drive concepts, for example, in the form of electric or pneumatic drives. Maintenance of those drives is reduced and, in particular, permits high rates of output of the goods to be produced, such as plastic containers.

This object is attained with a production device having a molding device of a first type rotatable about an axis to individual spatially separate stations. At least one station serves the purpose of blow molding. At least one station charges and seals the blow-molded container. In this manner, it is possible at least simultaneously to blow-mold a tube of plasticized plastic material for production of the plastic container and to charge a container already produced in this manner at the other station with the medium, particularly in the form of a fluid, and to seal this container. The output rates may be more or less at least doubled in the case of the respective assembly from the rate obtained with the known production devices for a blow molding, charging, and sealing process, since now it is no longer necessary to carry out all individual processes such as blow molding, charging, and sealing at only one station within the known production device to obtain a plastic container. By creating the individual production and processing stations, modern drive concepts can be used to control the individual molding devices by electric stepped drives so that fouling by a hydraulic medium or the like is avoided.

In that the individual production steps are divided among different stations, the safety and accuracy of processing is also improved in comparison to the known single-station production process, in which all production steps are carried out sequentially in one place (at one station) rather than simultaneously as in the case of the device claimed for the present invention.

In one preferred embodiment of the production device of the present invention, the respective tube of plasticized plastic material may be introduced into the molding device of the first type. A second station following in the direction of rotation, this extruded tube formed of plasticized plastic material may be subjected to blow molding to produce the container. The blow-molded container can be charged and sealed under sterile conditions at a following third station. Removal from the mold of the respective blow-molded container charged and sealed under sterile conditions can be carried out at a following fourth station. In this way, the entire production process for plastic containers is divided among four different stations, the production steps assigned to them being performed simultaneously at these stations. This arrangement results in very high cycling and rates of output of plastic products, even ones in the form of ampules, charged and sealed under sterile conditions.

In another preferred embodiment of the production device of the present invention the four stations are spaced circumferentially at an angle of 90° from each other in the direction of rotation four molding devices of the first type can rotate in sequence to the respective stations. Consequently, the production stations are spaced at uniform arc distance over the circumference of the production device, so that only extremely short production pauses occur when the molding device of the first type is rotated to the next production station. Provision preferably is made such that the respective molding device of the first type may be rotated about a vertical axis and such that the respective station is mounted so as to be stationary.

In another, especially preferred, embodiment of the production process of the present invention, in addition to the molding device of the first type, another molding device of a second type is provided for sterile sealing of the respective plastic container on its open neck and head side by which the respective container may be charged with the fluid under sterile conditions. The molding device of the first type preferably is mounted below the molding device of the second type The associated molding tools of the first and the second molding devices form a common longitudinal axis corresponding to the longitudinal axis of the container. In this way, the molding device of the first type is rotated as a whole with the molding device of the second type on the circumference of the associated molding tools (head jaws). This arrangement keeps the pivoting and rotating masses low, so that not only may the production process be carried out safely with reduced centrifugal forces, but the drive power for the rotation of the respective molding device is correspondingly reduced, lowering both the production costs and the operating costs involved in use of the production device.

In another preferred embodiment of the production device of the present invention, the respective molding device may be activated for moving at least one molding tool by a link control which moves the respective molding tool to a sealing position at least for sealing the mold. The link control can be actuated by a drive, preferably in the form of the electric stepping motor. This arrangement permits uniform, safe, and position-accurate driving of the respective molding tool, and requires only minor maintenance efforts. In addition, a plurality of opening and closing processes may be carried out in quick succession by the link control, favoring a high output of the goods to be produced.

It has been found to be especially advantageous for the production process for the respective drive for the respective molding device of the first kind to be stationary at least at part of the stations. This molding device can be coupled to the drive shaft of the drive by a coupling point. The drive is coupled to the molding device only if this coupling is necessary for an opening or closing process with the molding tools and, in particular during rotation of the molding device to and from a station. The associated drive is not to be driven along with the molding device. This arrangement reduces the forces of inertia and accordingly the centrifugal forces, and yields the advantages indicated in the foregoing. Preferably, the drive shaft for the first molding device is mounted perpendicularly to its rotational axis. The other drive shaft of the other drive for the molding device of the second type extends in parallel with this rotational axis. This other drive is mounted at the third production station so as to be stationary, the function of this station being charging and sterile sealing of the container. In this way, the molding device of the second type designed for an opening and closing process with its molding tools may be readily controlled, since, because of the different drive shafts, the associated drive systems with their different drives are situated on different planes inside the production device. At the third production station, the molding tools of the molding device of the second type are rotated in together with the molding device of the first type. After the other drive has been actuated, the molding tools of the molding device of the second type may be moved to the sealing position after the container has been charged, sterile sealing of the contents of the container being carried out, along with shaping of the head component in this sealing position.

In another preferred embodiment of the production device of the present invention, a laminar flow unit or a sterile barrier unit is present between the individual stations. A unit covers the free openings of the molding device of the first type and accordingly the respective container openings in advance of sterile sealing of the container. This unit makes certain that fouling particles will be prevented from entering the container opening with the fluid during the production process.

Other objects, advantages and salient features of the present invention will become apparent from the following detailed description, which, taken in conjunction with the annexed drawings, discloses a preferred embodiment of the present invention.

BRIEF DESCRIPTION OF THE DRAWINGS

Referring to the drawings which form a part of this disclosure.

DETAILED DESCRIPTION OF THE INVENTION

Figure 1:
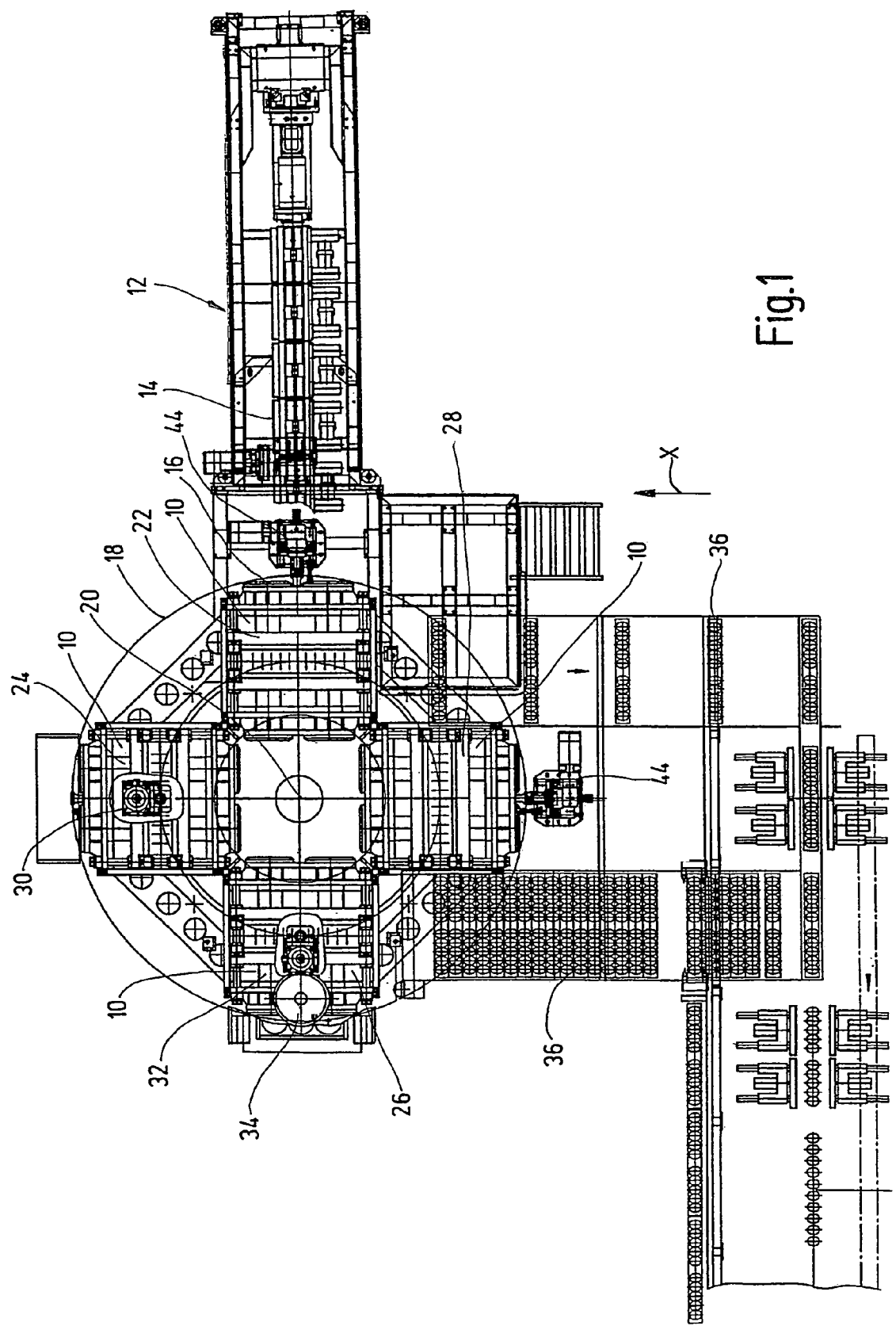
FIG. 1 is a top plan view of a production device according to an embodiment of the present invention.

FIG. 1 shows a top view of the production device for execution of a blow molding, charging, and sealing process for plastic containers, including ampules, with molding devices 10. Tubes of a plasticized plastic material produced by an extruder assembly 12 may be introduced into the respective molding device 10. Granulated plastic is melted along a heated extruder section 14 and introduced by a discharge assembly 16 into the respective molding tools of the molding device 10 of the first type, if the tools are in their opened position for reception of the respective extrusion tube. Consequently, ten extrusion tubes in a row, for example, may be received by molding device 10 of the first type. The respective molding device 10 may be pivoted or rotated in a horizontal plane about a vertically extending pivot or rotation axis 20 of the production device. In addition, the production device has four spatially separated stations 22, 24, 26, and 28, the first station 22 receiving the extrusion tubes as explained in the foregoing. The second station 24 performs the function of blow molding of extrusion tubes positioned side by side in a row by a blow molding assembly 30, which presses the individual plastic tubes by blast air against the mold walls of the molding tools of the molding device 10 of the first type to form containers. The blowing process may be supported by a vacuum, supporting air, or the like in the molding device of the first type. The next station 26 in the rotational direction performs the function of sterile charging of the plastic containers produced at the station 24. The ends of the containers are sealed after charging at the station 26. For this purpose, the drive unit of a molding device 32 of the second type is used at the station 26. The charging assembly 34 is mounted above the molding device 32 as shown facing the viewer in FIG. 1. The next station 28 following in the pivot direction performs the function of removal from the molds of the blow-molded, charged, and sealed plastic containers. The containers removed from the molding device 10 are pushed onto pallet lines 36, especially into packaging (not shown), for subsequent shipping.

As FIG. 1 also shows, the four stations 22, 24, 26, and 28 are spaced arcuately or circumferentially in sequence at an angle of 90° from each other in the pivot or rotational direction of the molding device 10 of the first type, inside the production device. The four molding devices 10 of the first type together with the molding tools of the molding device of the second type can be rotated in sequence into the respective stations 22, 24, 26, and 28. The production device shown in FIG. 1 may accordingly be used to carry out simultaneously all four different production operations, such as receipt of extrusion tubes, blow molding, charging and sealing, and mold removal. This arrangement appreciably increases the cycle and output rate of plastic to be produced in relation to comparable production devices in the state of the art which perform the treatment processes referred to sequentially at one station.

The respective molding device 10 of the first type is mounted so as to be pivotable or rotatable counterclockwise about the vertical axis 20. The respective stations 22, 24, 26, and 28 are positioned inside the production device so as to be stationary.

Figure 3:
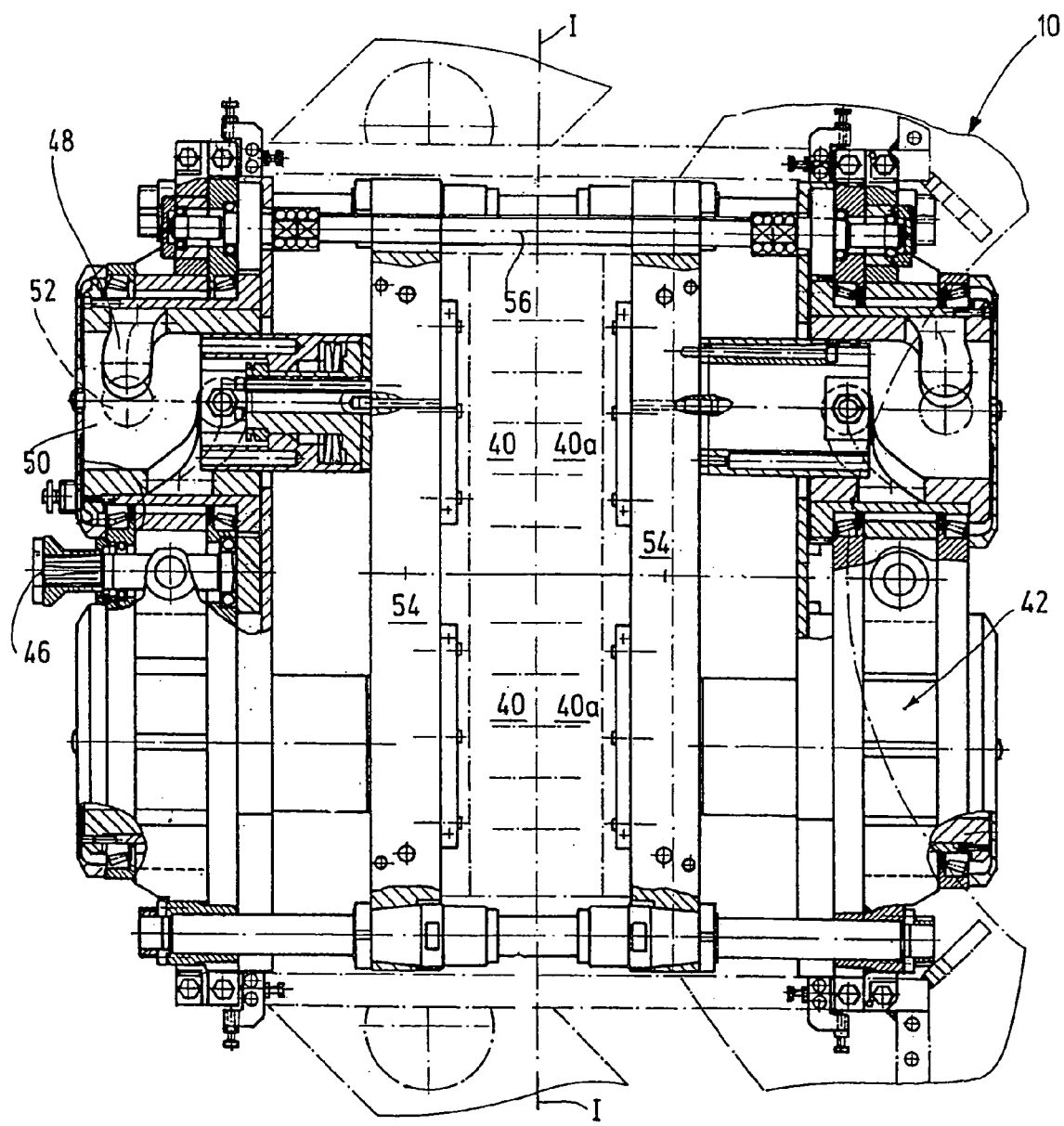
FIG. 3 is a top plan view of the molding device of the first type (described in detail in DE-A-103 17 711.6)

The configuration of the molding device 10 of the first type shown in the top view of FIG. 3. The respective molding device is also described in detail in DE-A-103 17 711.6 issued to the applicant, so that only the basic structure of the molding device will be specified here. The molding device 10 as a whole performs the function of moving molding tools 40, 40a. On its free frontal surface, the respective molding tool 40, 40a has trough-shaped recesses (not shown) which consequently form mold halves for generation of container geometries for plastic containers not shown, including ones in the form of ampules. The two molding tools 40, 40a work together to generate the respective container geometries. As seen in FIG. 3, the two molding tools 40, 40a are in the closed, molding, position in which the free frontal surfaces of the molding tools come together along a closing separating line.

Figure 2:
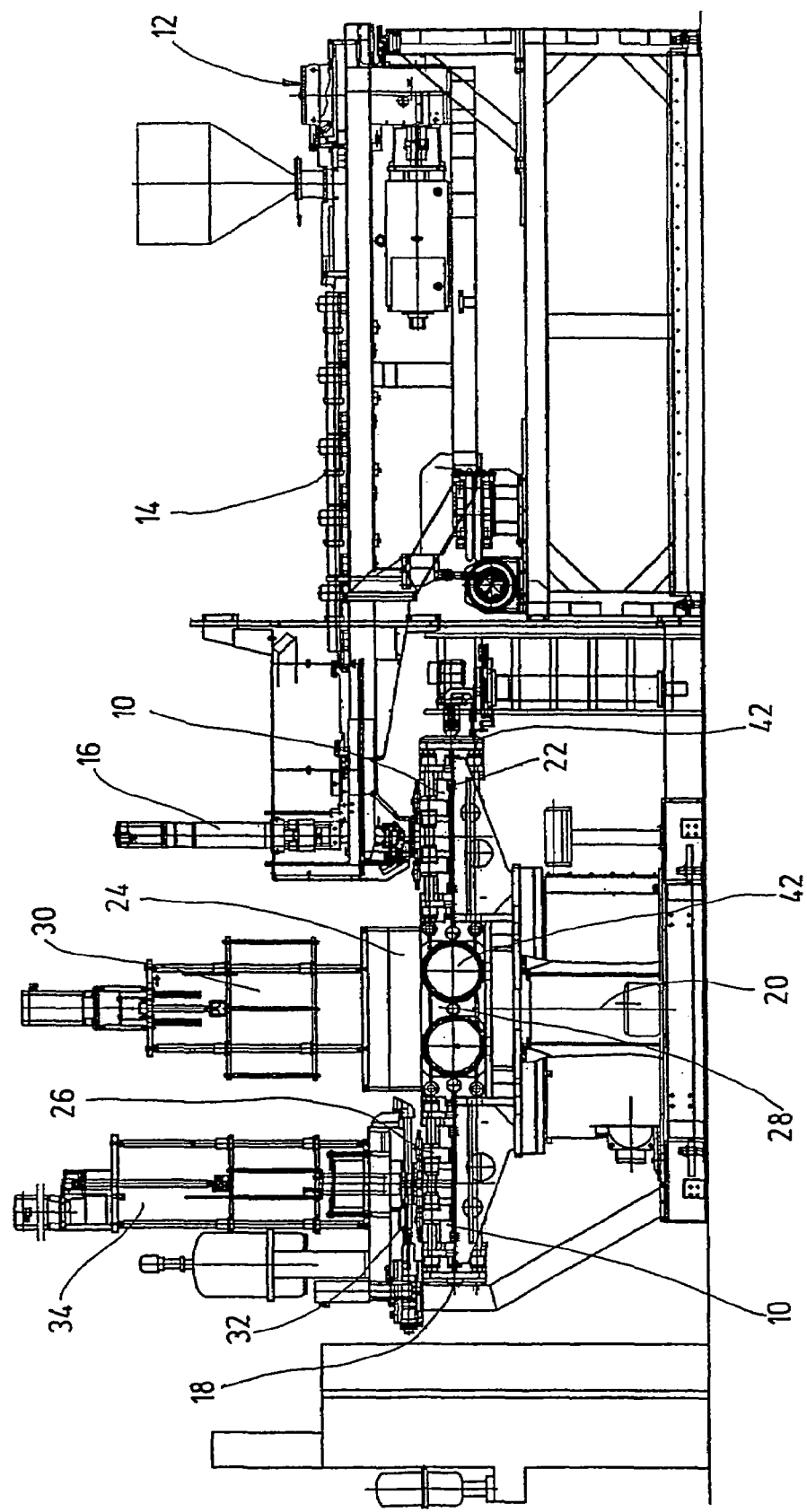
FIG. 2 is a side elevational view of the production device in the direction of the arrow X in FIG. 1, without the discharge station.

The function of moving the respective molding tool 40, 40a is performed as a whole by a link control component 42 and actuated by a centrally mounted drive 44. The splined shaft 46 of the drive 44 is shown in FIG. 3 for the sake of simplicity. The respective splined shaft 46 may be coupled by a coupling piece (not shown) such as a claw coupling to the driven shaft of an electric motor, for example, one in the form of an electric stepping motor which thus permits actuation of the link control component 42. The drive shaft of the molding device 10 pivots or rotates on a common axis with the driven shaft of the drive 44. The drive torque for the molding tools 40, 40a then is transmitted by the coupling. As is shown in FIG. 2, such a drive 44 is positioned centrally at least at the station 28, and at the station 22, for the purpose of opening the molding device to ensure execution of the process of removal from the mold and subsequent closing of the mold to permit seating of the respective extrusion tube formed by the extruder assembly 12 with its discharge assembly 16 and subsequently closing of the mold.

The link control component 42 has a slot guiding device 48 positioned on the external circumference side on a rotational element 50 which may be driven by the splined shaft 46. An actuating component 52 which operates in conjunction with a slot component 54 is engaged in the slot guiding device 48. When the slot guidance device 48 rotates from one of its end areas to its other end area and in the opposite direction, the associated slot component 54 may be moved with the molding tool 40, 40a by the longitudinally movable actuating component 52 from a closed position along closing line I-I into an open position (not shown) of the mold form by the respective molding tool 40, 40a and vice versa. Consequently, the molding tools 40, 40a may be moved in pairs simultaneously opposite a link control component 42 by the common drive components by drive 44 at the station provided for this purpose, so that four link control components in pairs opposite each other are actuated by a common operating shaft 56.

The drive unit of the molding device 32 of the second type is mounted at station 26 for each molding device 10 of the first type to be pivoted or rotated in, coming from the station 24. As seen in FIG. 2, the drive unit of the molding device 32 is mounted so as to be stationary. The respective molding device 10 of the first type may be pivoted or rotated below the drive unit of the molding device 32 of the second type into the station 26 by a central rotary drive (not shown), about the pivot or rotational axis 20 in a common horizontal plane 18. The molding tools 60 of the molding device 32 of the second type are moved along from the molding device 10 of the first type in the respective pivot or rotational movement. The respective molding device 32 of the second type is illustrated in detail at least in part in FIG. 4, and is also described in DE-A-103 17 712.4, so that only the basic aspects of this molding device will be discussed at this point.

Figure 4:
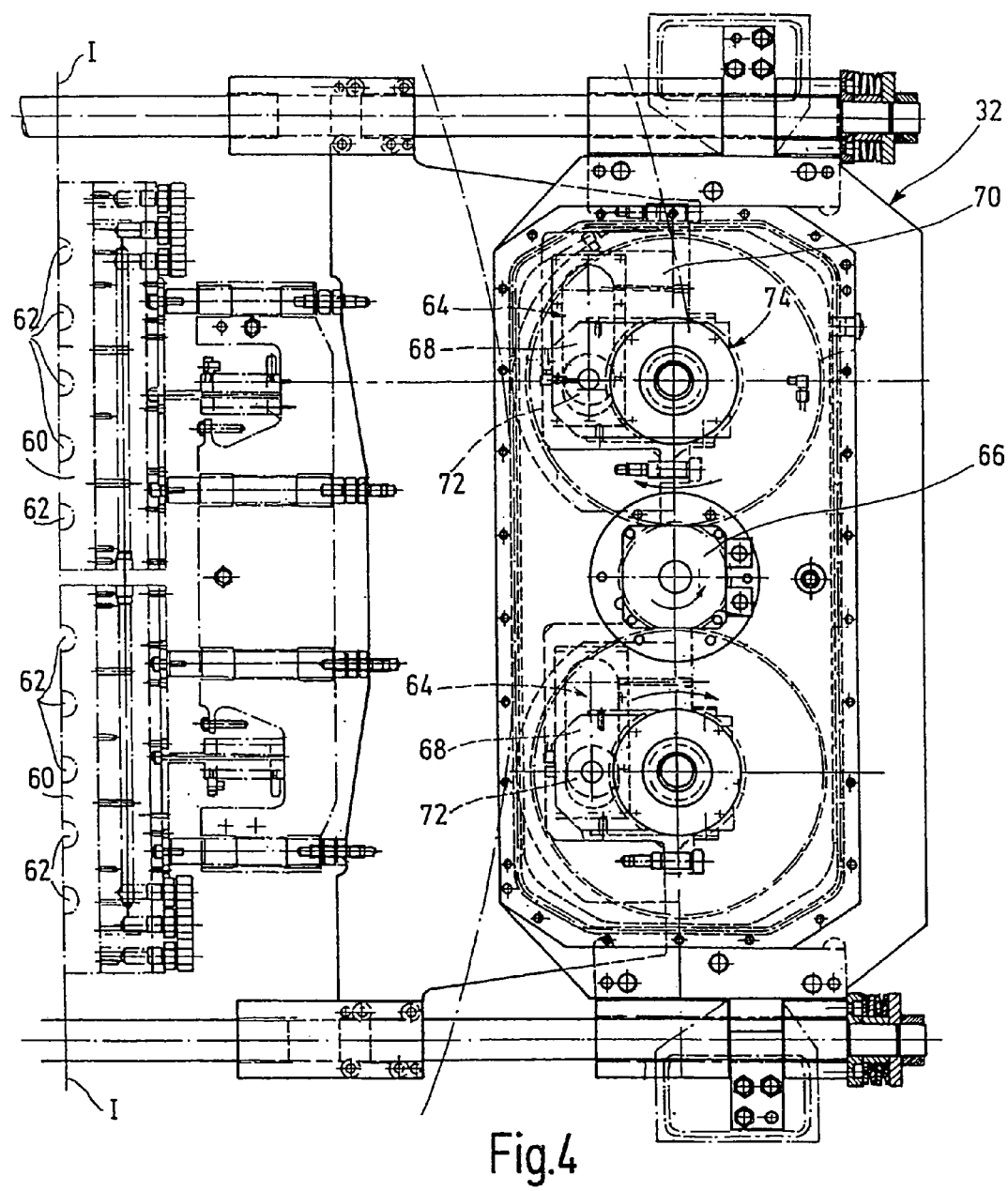
FIG. 4 is a top plan view of a part of the molding device of the second type (described in detail in DE-A-103 17 712.4).

The molding device 32 of the second type shown in FIG. 4 performs the function of moving molding tools 60 having trough-like recesses 62 on their front side which thus form mold halves for generation of head geometries for plastic containers not shown. To generate the head geometries in question, the respective molding tool 60 operates in conjunction with a corresponding molding tool with correspondingly configured recesses (not shown), the configuration shown in FIG. 4 is replicated correspondingly on the other side of the closing separating line I-I (not shown). The molding device 32 has for the purpose of moving the molding tool 60, a second link control component 64 as a drive unit by which the respective molding tool 60 may be actuated to close the mold along the closing line I-I. The other link control component 64 can be actuated in turn by another drive 66, preferably in the form of an electric motor, for example, in the form of an electric stepping motor. For this purpose, the other link control component 64 has a slot guide in a feed component 70 which is engaged by an actuating member 72 movable into a position corresponding to the open and closed position I-I of the molding tool 60 by a rotary part 74 actuated by the other drive 66. In this instance as well, the molding tools 60 opposite each other forming a pair in turn may be moved synchronously by a link control component 64 into their closed position. Two electric drives 66 opposite the closing separating line actuate two link control components 64 opposite each other forming a pair to move the molding tools 60.

As a result of superposition of the two molding devices 10 and 32 at the station 26, the latter with its molding tools 10, 60 form a common longitudinal axis which corresponds to the longitudinal axis of the container. The drive unit 64, 66 of the molding device 32 remains at the station 26, while the molding tools 60 of the device 32 are brought to the station 26 with the respective molding device 10. At that station, the drive unit 64, 66 moves the molding tools 60 to the sealing position. The molding device 10 at the station 26, as viewed in FIG. 2, remains below the molding device 32.

Consequently, in the configuration the drive shaft for the first molding device 10 is mounted so as to extend perpendicularly to its pivot axis 20, while the other drive shaft of the other drive 66 for the molding device 32 of the second type extends in parallel with this pivot axis 20. In addition, the other drive 66 is mounted on the second molding device 32 so as to be stationary. In addition, there is positioned between the individual stations 22, 24, 26, and 28, a laminar flow unit or sterile barrier (not shown) which covers the free openings of the molding device 10 of the first type and accordingly the respective container opening in advance of its sterile sealing.

Use of the production device of the present invention and distribution of different molding steps among different stations creates a sort of carrousel configuration, permitting very high cycle frequencies for output of the plastic material in the form of containers. The hygienic requirements are to a great extent satisfied by the use of electric drives. In particular, the production device itself with its stations is hermetically sealed off from the extruder assembly which separates the plasticized plastic material, so that clean room conditions may be created for the blow molding, charging, and sterile sealing process itself, should this be desired by the user.

While one embodiment has been chosen to illustrate the invention, it will be understood by those skilled in the art that various changes and modifications can be made therein without departing from the scope of the invention as defined in the appended claims.

What is claimed is:

1. A production device for blow molding, charging and sealing plastic containers, comprising:
    a first molding device that can receive a tube of plasticized plastic material, said first molding device being rotatable about a rotational axis to individual spatially separated stations, one of said stations being a blow molding station for blow molding containers, another one of said stations being a charging and sealing station for charging and sealing blow molded containers;
    a second molding device for sterile sealing of containers on open necks and head sides thereof through which containers in said first molding device can be charged with fluid under sterile conditions; and
    a stationary drive unit for said second molding device, said first molding device being rotatable to a position below said drive unit such that molding tools of said first and second molding devices define a common longitudinal axis.

2. A production device according to claim 1 wherein said stations comprise first, second, third and fourth stations arranged in rotational sequence, said first station delivering a tube of plasticized plastic material into said first molding device, said second station being said blow molding station, said third station being said charging and sealing station and charging and sealing blow molded containers under sterile conditions, said fourth station removing blow molded, charged and sealed container from said first molding device.

3. A production device according to claim 2 wherein said first, second, third and fourth stations are circumferentially spaced from one another by arcs of 90 degrees in a rotational direction; and
    four first molding devices are rotatable in sequence to said first, second, third and fourth stations.

4. A production device according to claim 1 wherein said rotational axis is vertical; and
    said stations are stationary.

5. A production device according to claim 1 wherein each said molding device comprises at least one molding tool actuated by a link control component to move said molding tool thereof into a sealing position for closing the respective molding device, each said link control component being driven by an electric stepping motor.

6. A production device according to claim 5 wherein first drives for said first molding device are mounted stationary on some of said stations, and have first driven shafts; and
    said first molding device is respectively coupled to said first driven shafts by a coupling point thereof.

7. A production device according to claim 6 wherein said first driven shafts extend perpendicular to said rotational axis; and
    said drive unit comprises a drive shaft extending parallel to said first rotational axis and mounted on said second molding device so as to be stationary.

8. A production device according to claim 1 wherein one of a laminar flow unit and a sterile barrier is between individual ones of said stations, covers free openings of said first molding device, and covers container openings before the openings are sealed under sterile conditions.

9. A production device for blow molding, charging and sealing plastic containers, comprising:
    a first molding device that can receive a tube of plasticized plastic material, said first molding device being rotatable about a rotational axis to individual spatially separated stations, one of said stations being a blow molding station for blow molding containers, another one of said stations being a charging and sealing station for charging and sealing blow molded containers;
    a second molding device for sterile sealing of containers on open necks and head sides thereof through which containers in said first molding device can be charged with fluid under sterile conditions;
    each said molding device having at least one molding tool actuated by a link control component to move said molding tool thereof into a sealing position for closing the respective molding device, each said link control component being driven by an electric stepping motor;
    first drives for said first molding device mounted stationary on some of said stations, and having first driven shafts; and
    a coupling point on said first molding device respectively coupling said first molding device to said first driven shafts.

10. A production device according to claim 9 wherein said stations comprise first, second, third and fourth stations arranged in rotational sequence, said first station delivering a tube of plasticized plastic material into said first molding device, said second station being said blow molding station, said third station being said charging and sealing station and charging and sealing blow molded containers under sterile conditions, said fourth station removing blow molded, charged and sealed container from said first molding device.

11. A production device according to claim 10 wherein said first, second, third and fourth stations are circumferentially spaced from one another by arcs of 90 degrees in a rotational direction; and
    four first molding devices are rotatable in sequence to said first, second, third and fourth stations.

12. A production device according to claim 9 wherein said rotational axis is vertical; and
    said stations are stationary.

13. A production device according to claim 9 wherein said first driven shafts extend perpendicular to said rotational axis; and
    said drive unit comprises a drive shaft extending parallel to said first rotational axis and mounted on said second molding device so as to be stationary.

14. A production device according to claim 9 wherein one of a laminar flow unit and a sterile barrier is between individual ones of said stations, covers free openings of said first molding device, and covers container openings before the openings are sealed under sterile conditions.

* * * * *